United States Patent
Yantis (10) Patent No.: US 10,281,154 B2
(45) Date of Patent: May 7, 2019

(54) ILLUMINATED KNOB ASSEMBLY FOR AN APPLIANCE

(71) Applicant: General Electric Company, Schenectady, NY (US)

(72) Inventor: John Adam Yantis, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 421 days.

(21) Appl. No.: 15/134,426

(22) Filed: Apr. 21, 2016

(65) Prior Publication Data
US 2017/0307206 A1   Oct. 26, 2017

(51) Int. Cl.
| | |
|---|---|
| F21S 13/00 | (2006.01) |
| F24C 3/12 | (2006.01) |
| F21V 8/00 | (2006.01) |
| F24C 7/08 | (2006.01) |
| F24C 15/10 | (2006.01) |

(52) U.S. Cl.
CPC .............. *F24C 3/124* (2013.01); *F24C 7/083* (2013.01); *F24C 15/10* (2013.01); *G02B 6/0001* (2013.01); *F21S 13/00* (2013.01); *F24C 7/082* (2013.01)

(58) Field of Classification Search
CPC .......... F24C 3/124; F24C 15/10; F21C 7/083; F21C 7/082; G02B 6/0001; G01D 11/28; H01H 2009/164; H05B 6/1218; H05B 6/12; F21V 33/0044; F21V 19/06; F21S 13/00
See application file for complete search history.

(56) References Cited

U.S. PATENT DOCUMENTS

| | | | |
|---|---|---|---|
| 5,335,148 A | 8/1994 | Tominaga | |
| 6,224,221 B1 | 5/2001 | Glienicke | |
| 6,471,648 B1 * | 10/2002 | Gamelsky et al. | ...... A61B 8/00 600/437 |
| 6,571,727 B2 | 6/2003 | Gjerde | |
| 6,733,146 B1 | 5/2004 | Vastano | |
| 8,813,676 B2 | 8/2014 | Fuller et al. | |
| 8,851,692 B2 | 10/2014 | Baier | |
| 2005/0284741 A1 * | 12/2005 | Suzuki | ................. H01H 19/025 200/310 |
| 2013/0270251 A1 * | 10/2013 | Furuti et al. | ............ F24C 7/083 219/445.1 |

(Continued)

FOREIGN PATENT DOCUMENTS

WO    WO2013041518 A1    3/2013

*Primary Examiner* — Y M. Lee
(74) *Attorney, Agent, or Firm* — Dority & Manning, P.A.

(57) ABSTRACT

A knob assembly includes a light guide and a control knob that is independently rotatable relative to the light guide. The light guide is positioned at an aperture formed on a surface such that the light guide receives light emitted by a light source positioned below the surface along a vertical direction. The light guide also defines a guide opening, and further includes an opaque and translucent region. The control knob defines a light opening and is rotatably coupled to a stem extending through the guide opening. The control knob is rotatable between a first and second position. In the first position, the light opening is positioned entirely over the opaque region of the light guide along the vertical direction. In the second position, the light opening is positioned entirely over the translucent region of the light guide along the vertical direction. A related cooktop appliance is provided.

20 Claims, 9 Drawing Sheets

(56) References Cited

U.S. PATENT DOCUMENTS

| | | |
|---|---|---|
| 2014/0204557 A1 | 7/2014 | Cadima et al. |
| 2015/0124435 A1* | 5/2015 | Masterman et al. ...... F21V 5/04 362/101 |

* cited by examiner

ILLUMINATED KNOB ASSEMBLY FOR AN APPLIANCE

FIELD OF THE INVENTION

The present subject matter relates generally to control knobs on an appliance, such as a cooking appliance. More particularly, the present subject matter relates to an improved assembly for illuminating the control knobs such that light may be used to provide indicia regarding movement or position of the control knobs.

BACKGROUND

Knobs are commonly used on a variety of commercial and residential appliances to control an operating condition of the appliance. Knobs are particularly common on cooking appliances, such as stoves or cooktops. Various shapes and sizes can be used depending upon e.g., the intended application, aesthetics, and other factors.

For example, cooktop traditionally have at least one heating element positioned at a cooktop surface for use in heating or cooking an object, such as a cooking utensil, and its contents. The at least one heating element may heat a cooking utensil directly through induction heating, or may use another heat source such as electrically resistant coils or gas burners. In gas burner cooktops, air is required for the combustion of the gas fuel. For that reason, some gas burner cooktops have air intake openings to allow for a sufficient amount of air intake to meet the combustion requirements of the gas burners. These openings are sometimes located beneath the knobs. When this is the case, some gas cooktops have light installed below air intake openings located underneath the knobs so that the light may shine through the openings and communicate certain conditions to the user, such as e.g., whether the knob is in an "on" position.

Certain challenges exist with this construction, however. Such construction, for example, does not use light emitted through the openings to communicate rotation of the control knob. As such, this construction cannot rely upon light to provide indicia regarding movement or position of the control knob.

Accordingly, an improved control knob assembly that uses light to indicate movement and position of the control knob would be beneficial.

BRIEF DESCRIPTION OF THE INVENTION

Aspects and advantages of the invention will be set forth in part in the following description, or may be obvious from the description, or may be learned through practice of the invention.

In a first exemplary embodiment, a knob assembly for a cooking appliance is provided. The knob assembly may generally include a surface defining an aperture. The knob assembly may also include a light guide positioned at the aperture, wherein the light guide may define a guide opening and may further include an opaque region and a translucent region. In addition, the knob assembly may include a light source located below the surface along a vertical direction, wherein the light source is positioned such that light emitted by the light source is received by the light guide. The knob assembly may also include a control knob rotatably coupled to a stem extending through the guide opening of the light guide. The control knob may include a light opening and may be rotated between a first and second position. In the first position, the light opening may be positioned entirely over the opaque region of the light guide. The control knob may be rotated to the second position such that the light opening may be positioned entirely over the translucent region of the light guide.

In a second exemplary embodiment, a cooktop appliance is provided. The cooktop appliance may generally include a cooktop surface defining an aperture. The cooktop appliance may also include a burner disposed in the cooktop surface. In addition, the cooktop appliance may include a knob assembly. The knob assembly may generally include a surface defining an aperture. The knob assembly may also include a light guide positioned at the aperture, wherein the light guide may define a guide opening and may further include an opaque region and a translucent region. In addition, the knob assembly may include a light source located below the surface along a vertical direction, wherein the light source is positioned such that light emitted by the light source is received by the light guide. The knob assembly may also include a control knob rotatably coupled to a stem extending through the guide opening of the light guide. The control knob may include a light opening and may be rotated between a first and second position. In the first position, the light opening may be positioned entirely over the opaque region of the light guide. The control knob may be rotated to the second position such that the light opening may be positioned entirely over the translucent region of the light guide.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Repeat use of reference characters in the present specification and drawings is intended to represent the same or analogous features or elements of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Figure 1:
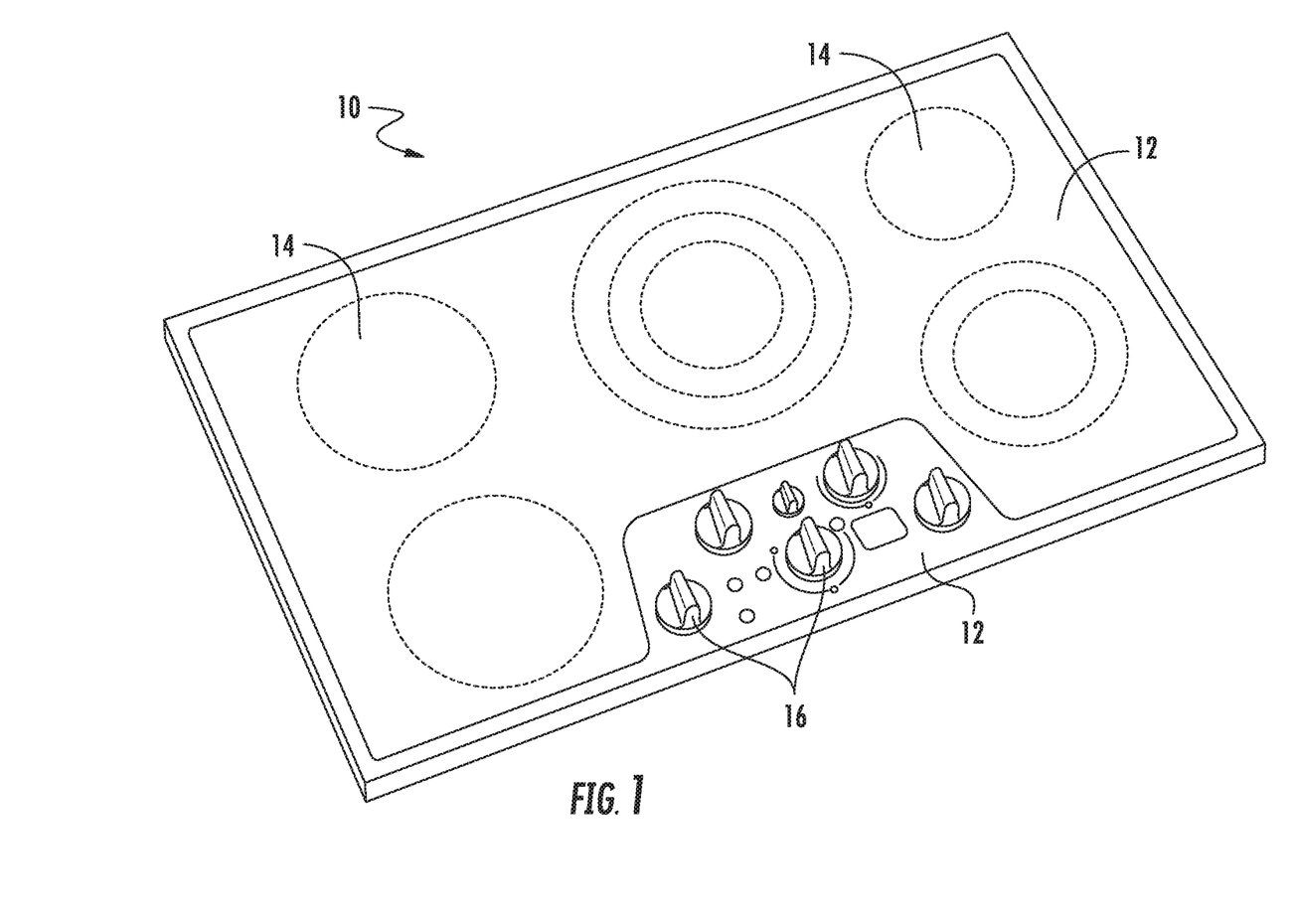
FIG. 1 provides a perspective view of an exemplary embodiment of a cooking appliance of the present disclosure.

Referring now to the drawings, FIG. 1 illustrates an exemplary embodiment of a cooking appliance 10 of the present disclosure. Cooking appliance 10 may be, e.g., fitted integrally with a surface of a kitchen counter, or be a part of one or more oven appliances. Cooking appliance 10 can include a chassis (not shown) and a cooktop surface 12 having one or more heating elements 14 for use in, e.g., heating or cooking. In one exemplary embodiment, cooktop surface 12 is comprised of ceramic glass. In other embodiments, however, cooktop surface 12 may be comprised of another suitable material, such as a metallic material (e.g., steel) or other suitable non-metallic material. Heating elements 14 may be various sizes, as shown in FIG. 1, and may employ any suitable method for heating or cooking an object, such as a cooking utensil (not shown), and its contents. In one embodiment, for example, heating element uses a heat transfer method, such as electric coils or gas burners, to heat the cooking utensil. In another embodiment, however, heating element 14 uses an induction heating method to heat the cooking utensil directly.

The amount of heat delivered by each heating element 14 on cooktop surface 12 is controlled by a corresponding controller 36 and control knob 16, as is detailed in the exemplary embodiments described below and shown in FIG. 2. Knob 16, as used herein, refers to any configuration of dial, and not just one having a circular base, as shown in FIG. 1. For example, the present disclosure contemplates exemplary embodiments wherein knobs 16 have a rectangular base, an ovular base, or any other shape having one or more curved lines, straight lines, or both.

Figure 2:
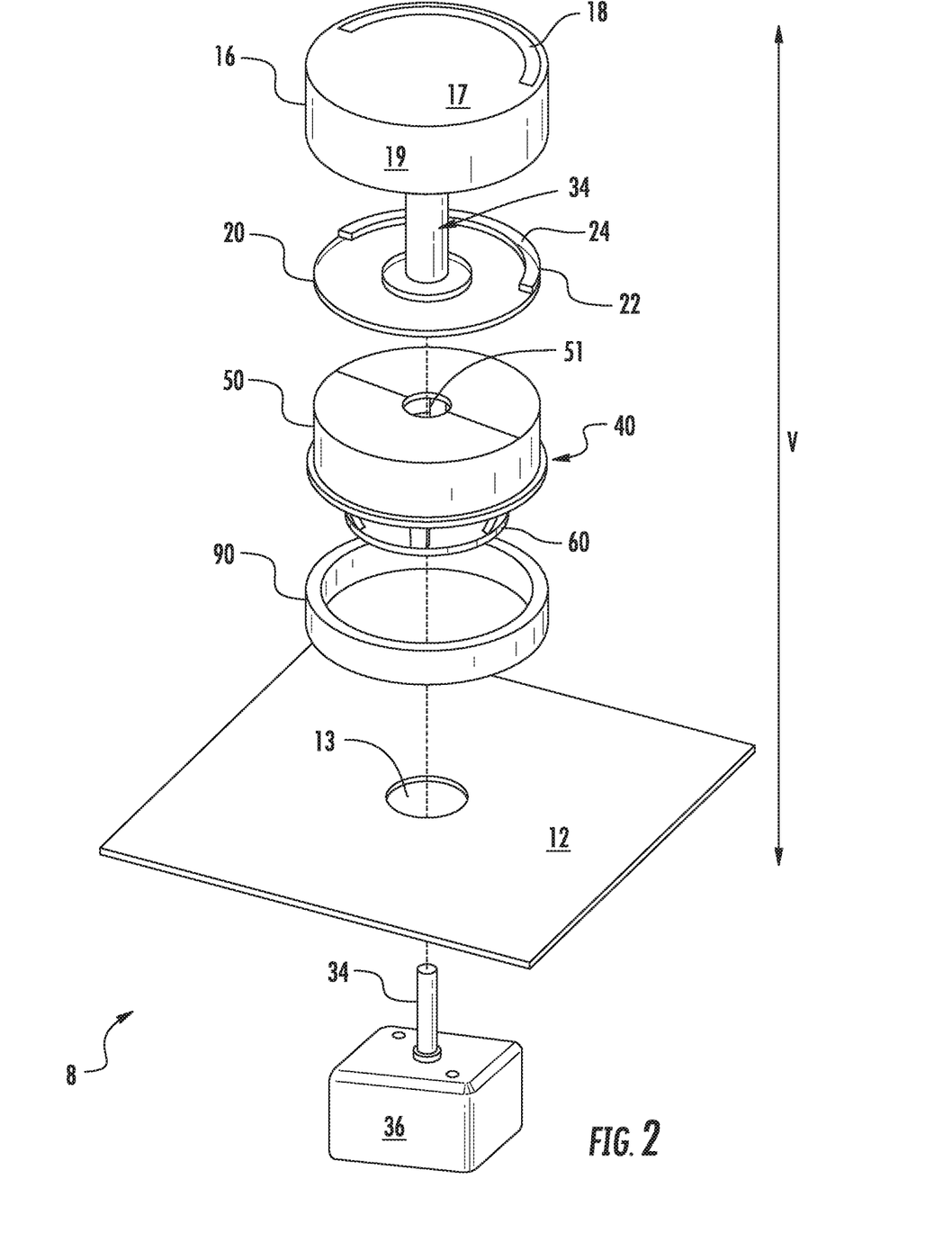
FIG. 2 provides an exploded perspective view of an exemplary embodiment of a knob assembly of the present disclosure.

FIG. 2 shows an exploded perspective view of an exemplary embodiment of a knob assembly 8 for a cooking appliance 10. In this embodiment, knob assembly 8 includes cooktop surface 12 defining an aperture 13. Cooktop surface 12, as used herein, refers to any surface of cooking appliance 10. For example, the present disclosure contemplates exemplary embodiments where the entirety of cooktop surface 12 is comprised of a single suitable material and other embodiments where cooktop surface 12 is comprised of one material proximate to heating elements 14, and another material proximate to control knobs 16.

Figure 3:
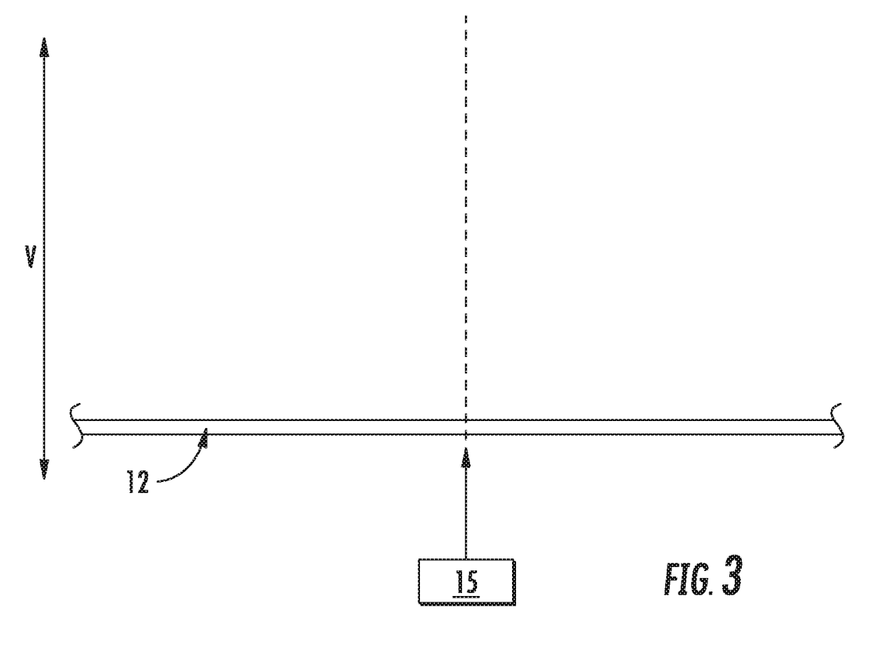
FIG. 3 provides a cross-sectional view of a light source positioned below the cooktop surface of FIG. 2 along the vertical direction.

In one exemplary embodiment, knob assembly 8 also includes a light guide 40 positioned at aperture 13 in cooktop surface 12. Light guide 40 may include an upper portion 50 and a lower portion 60. Upper portion 50 is positioned above and spaced apart from lower portion 60 along a vertical direction V. Further, upper portion 50 defines a guide opening 51. Light guide 40 receives light emitted by a light source 15 of knob assembly 8 that, as shown in FIG. 3, may be positioned below cooktop surface 12 along vertical direction V. Light source 15 may be a light-emitting diode (LED) or other suitable source. In some embodiments, light source 15 may be positioned collinear with aperture 13 along vertical direction V.

In the embodiment shown, control knob 16 of knob assembly 8 includes a top surface 17 that defines a light opening 18. Control knob 16 also includes a side surface 19 that extends downward from top surface 17 along vertical direction V. In the embodiment shown, control knob 16 is rotatably coupled to a stem 34 extending through aperture 13 and guide opening 51 along vertical direction V. More specifically, stem 34 extends from a controller 36, such as a controller used to adjust the amount of heat delivered to heating element 14. Further, control knob 16 is independently rotatable, such as about vertical axis V relative to light guide 40.

Although FIG. 2 depicts stem 34 and controller 36 as a single component, one of ordinary skill in the art understands that other embodiments in which stem 34 is a separate component from controller 36. For instance, stem 34 may, in one embodiment, be integrally formed with control knob 16. In yet another embodiment, stem 34 may be removably coupled to both control knob 16 and controller 36.

Still referring to the embodiment shown in FIG. 2, controller 36 may include a memory and microprocessor, such as a general or special purpose microprocessor operable to execute programming instructions or micro-control code. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 36 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

In the embodiment shown, knob assembly 8 includes a lens 20 positioned between top surface 17 of control knob 16 and light guide 40 along vertical direction V. Lens 20 includes a raised portion 22 that extends into light opening 18 along vertical direction V. In some exemplary embodiments, a top surface 24 of raised portion 22 is substantially flush with top surface 17 of control knob 16. In other embodiments, however, top surface 24 of raised portion 22 may extend above top surface 17 of control knob 16 along vertical direction V. Lens 20, including raised portion 22, may be made from any suitable material, such as glass or plastic.

Knob assembly 8 may also include a bezel 90 positioned between upper portion 50 of light guide 40 and cooktop surface 12 along vertical direction V. Bezel 90 may be made from any suitable material, including metals and plastics.

Figure 4:
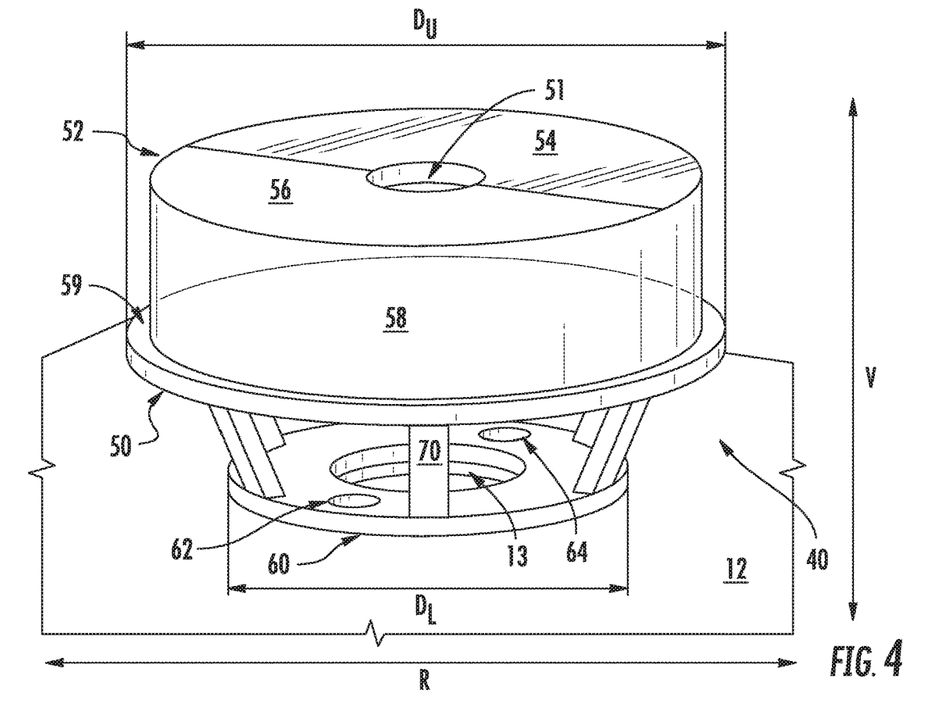
FIG. 4 provides a perspective view of an exemplary embodiment of a light guide for a knob assembly of the present disclosure.
Figure 5:
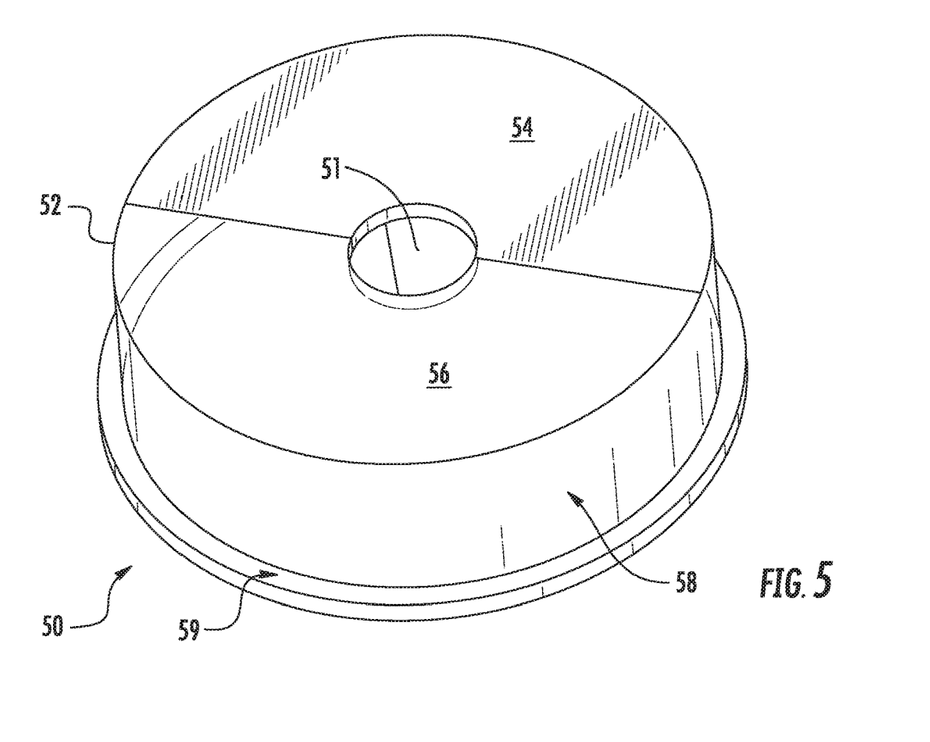
FIG. 5 provides a perspective view of an upper portion of the light guide shown in FIG. 4.
Figure 6:
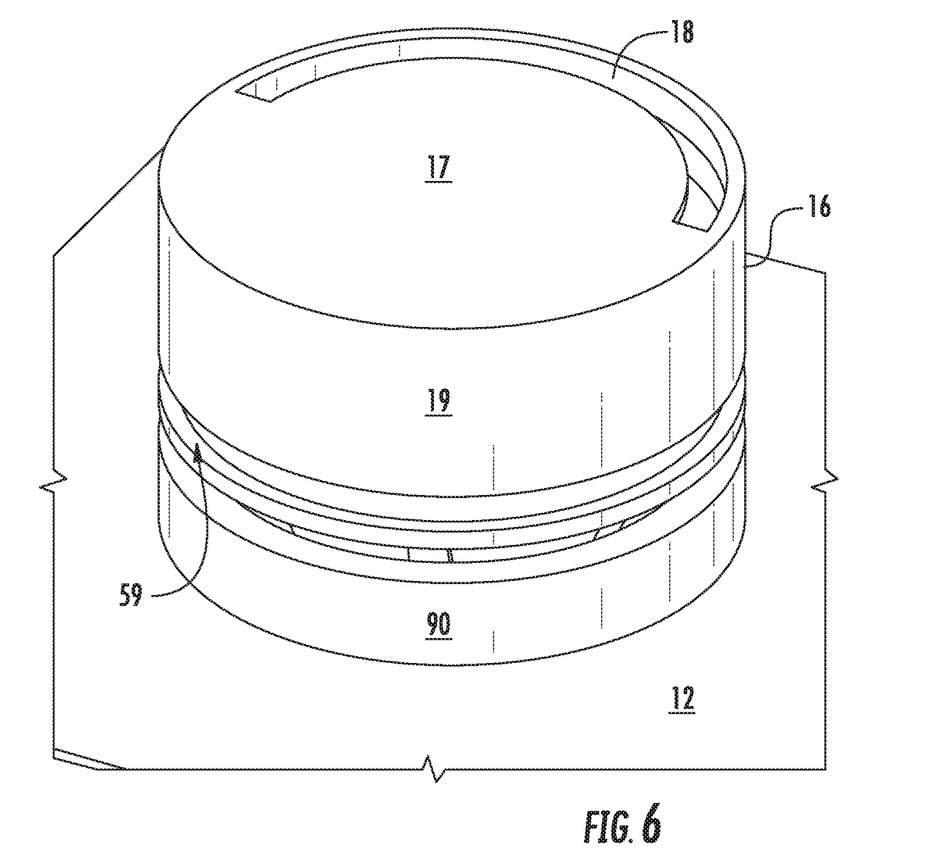
FIG. 6 provides a perspective view of the knob assembly of FIG. 2.

Referring now to FIGS. 4-6, an exemplary embodiment of light guide 40 is shown. In this exemplary embodiment, upper portion 50 of light guide 40 includes a top surface 52 having an opaque region 54 and a translucent region 56. Opaque region 54 is comprised of an opaque material suitable to block light received from light source 15. In contrast, translucent region 56 is comprised of a translucent material that allows light from light source 15 to pass therethrough. Further, although in the embodiment shown, opaque region 54 and translucent region 56 comprise equal amounts of top surface 52, one of ordinary skill in the art having the benefit of the present disclosure would understand that opaque region 54 and translucent region 56 may comprise disproportionate amounts of top surface 52.

Still referring to FIGS. 4-6, upper portion 50 of light guide 40 also includes a side surface 58 that extends downwardly from top surface 52 along vertical direction V. Further, upper portion 50 of light guide 40 includes a flange 59 that extends outward from side surface 58 along a radial direction R, and is positioned between bezel 90 and control knob 16 along the vertical direction V. In the embodiment shown, flange 59 extends around a perimeter of side surface 58. In alternative embodiments, however, flange 59 may only extend around a portion of the perimeter of side surface 58. Still further, flange 59 and side surface 58 may be comprised of translucent material such that flange 59 and side surface 58 may, upon receiving light from light source 15, illuminate the perimeter of side surface 58.

Lower portion 60 of light guide 40 is positioned at aperture 13 of cooktop surface 12, and defines a first aperture 60 and a second aperture 62. In this embodiment, lower portion 60 may be fastened to cooktop surface 12 with mechanical fasteners (not shown) extending through first and second aperture 62, 64 and corresponding apertures (not shown) in cooktop surface 12. In other embodiments, lower portion 60 of light guide 40 may not include first and second apertures 62, 64 and may, instead, be coupled to cooktop surface 12 via any suitable bonding material.

Light guide 40 also includes a plurality of support members 70 extending from upper portion 50 to lower portion 60. Each support member 70 is preferably comprised of translucent material. Further, in the embodiment shown, upper portion 50 and lower portion 60 are both circular and, as a result, both upper and lower portions 50, 60 define a circular cross-sectional area. More specifically, upper portion 50 of light guide 40 defines a first maximum diameter $D_U$ that surrounds a second maximum diameter $D_L$ defined by lower portion 60 of light guide 40. As such, each support member 70 extends radially inward from upper portion 50 of light guide 40 to lower portion 60 of light guide 40 along radial direction R.

Referring now to FIGS. 2, 3, 4 and 7, control knob 16 is shown in a first position 710 in which light opening 18 of control knob 16 is positioned entirely over opaque region 54 of light guide 40 along vertical direction V. As such, since, in first position 710, light opening 18 is positioned entirely over opaque region 54, light emitted by light source 15 cannot illuminate light opening 18. In some embodiments, first position 710 may correspond to an "off" position in which a heating element 14 controlled by control knob 16 via controller 36 delivers no heat.

Figure 7:
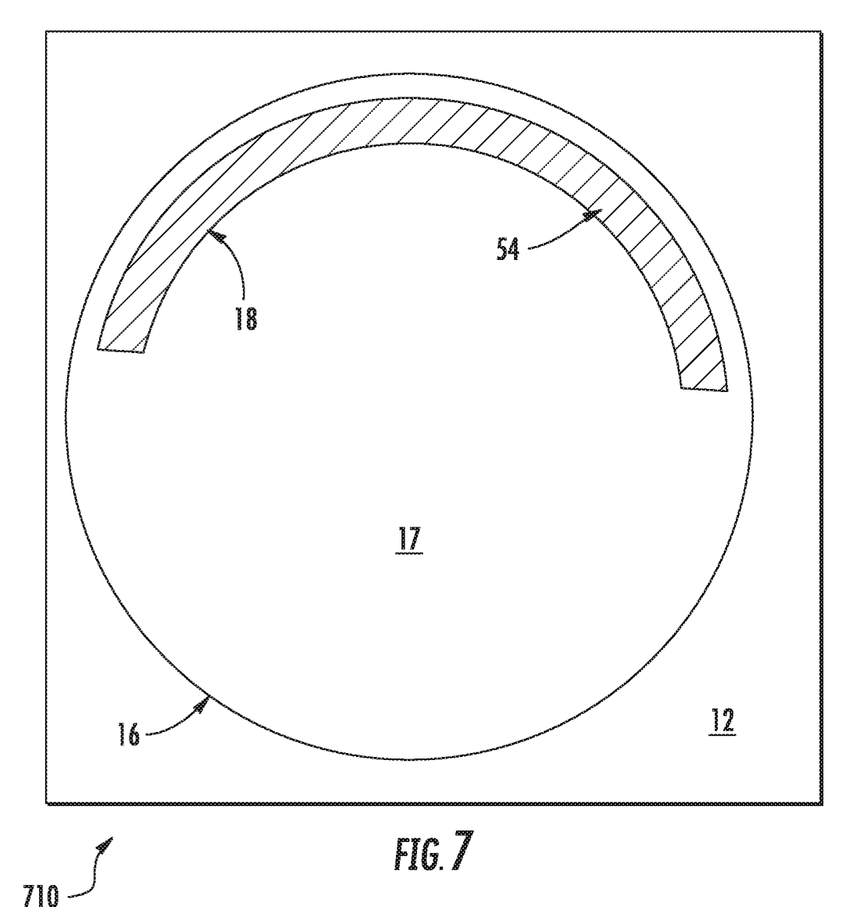
FIG. 7 provides a plan view of an exemplary embodiment of a knob assembly in a first position.

Control knob 16 is rotatable from first position 710 shown in FIG. 7 to other positions described below in more detail. Further, since control knob 16 is independently rotatable relative to light guide 40, position of light opening 18 relative to top surface 52 of light guide 40 may vary as control knob 16 rotates. More specifically, position of light opening 18 relative to top surface 52 of light guide 40 may vary such that light opening 18 is no longer positioned entirely over opaque region 54 along vertical direction V.

Referring now to FIGS. 2, 3, 4 and 9, control knob 16 is shown in a second position 910 in which light opening 18 of control knob 16 is positioned entirely over translucent region 56 of light guide 40 along vertical direction V. As such, since, in second position 910, light opening 18 is positioned entirely over translucent region 56, light emitted by light source 15 illuminates light opening 18. In some embodiments, second position 910 may correspond to a "fully on" position in which heating element 14 controlled by control knob 16 via controller 36 delivers a maximum amount of heat.

Figure 8:
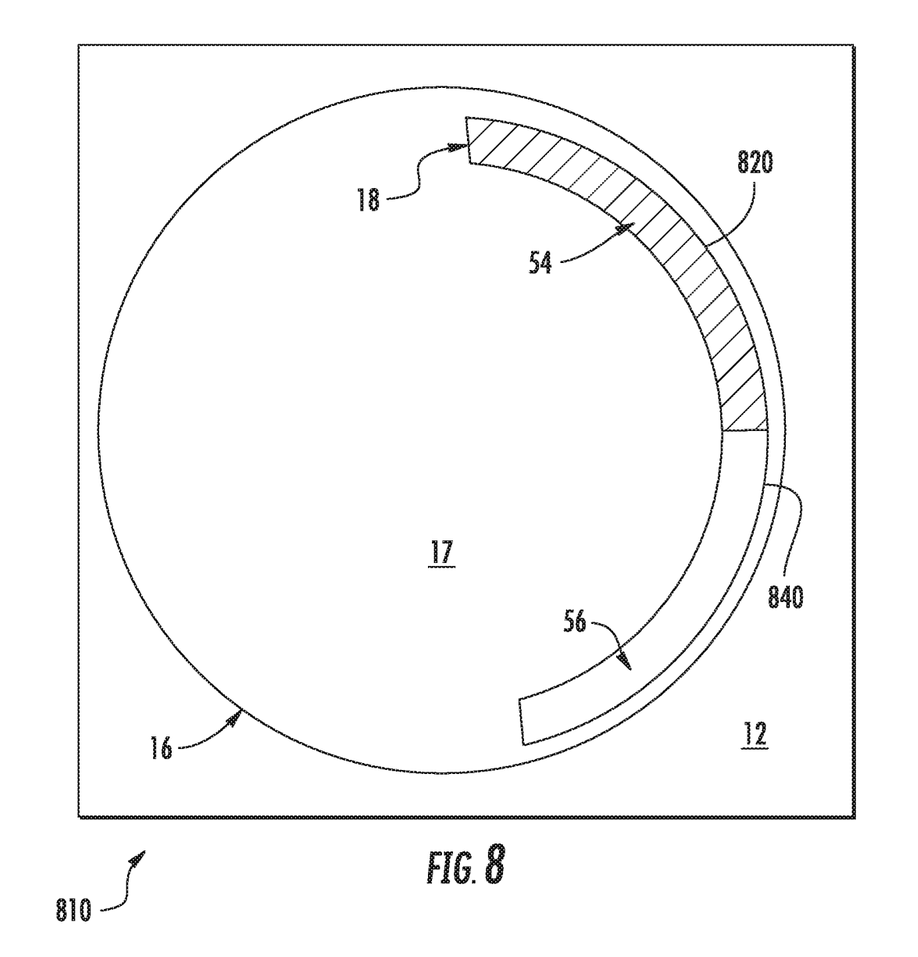
FIG. 8 provides a plan view of the knob assembly of FIG. 7 in an intermediate third position.
Figure 9:
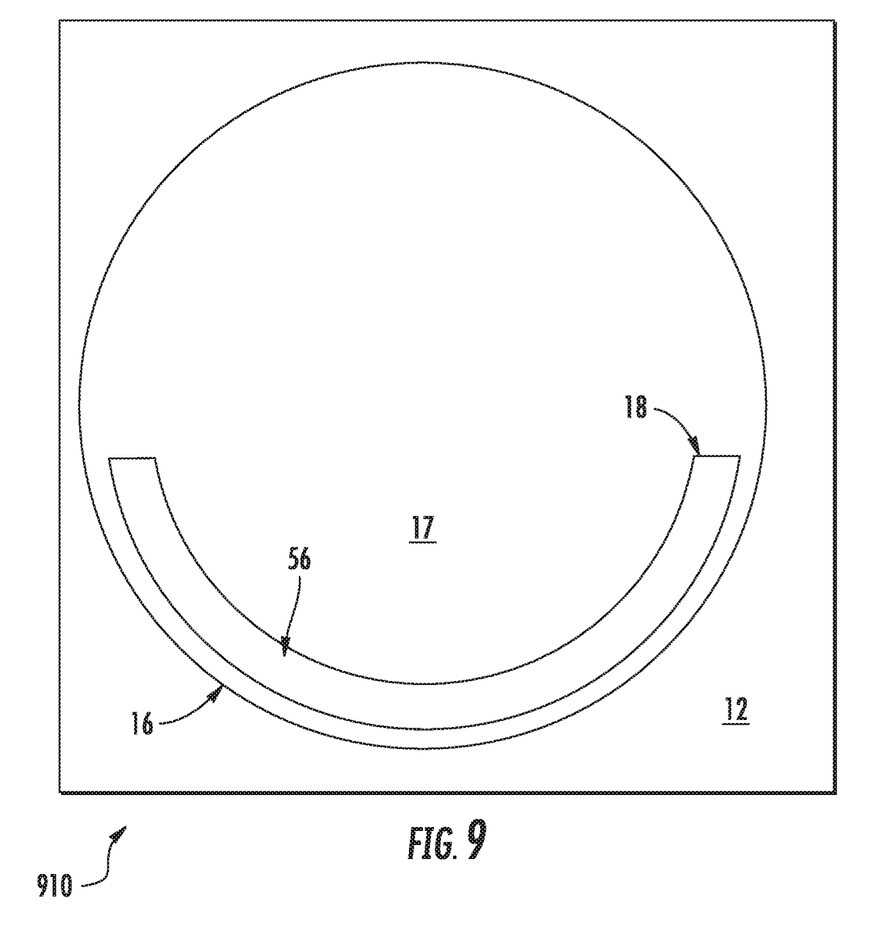
FIG. 9 provides a plan view of the knob assembly of FIG. 7 in a second position.

Still further, as shown in FIG. 8, control knob 16 is rotatable to an intermediate third position 810 in which a first portion 820 of light opening 18 is positioned over opaque region 56 along vertical direction V, and a second portion 840 of light opening 18 is positioned over translucent region 56 along vertical direction V. Intermediate third position 810 may be encountered during rotation of control knob 16 between first position 710 and second position 910. As such, since, in intermediate third position 810, only second portion 840 of light opening 18 is positioned over translucent region 56, light emitted by light source 15 illuminates only second portion 840 of light opening 18. In some embodiments, intermediate third position 810 may correspond to an "partially on" position in which heating element 14 controlled by control knob 16 via controller 36 delivers an amount of heat that is less than the maximum amount of heat that corresponds to the "fully on" position discussed above.

Although FIG. 8 shows intermediate third position 810 as being halfway between first and second positions 710 and 910, it is understood that intermediate third position 810 may correspond to any number of intermediate third positions between first and second positions 710 and 910. As an example, control knob 16 may be rotated to an intermediate third position 810 in which seventy-five percent of light opening 18 is positioned over translucent region 56 along vertical direction V, and the remaining twenty-five percent of light opening 18 is positioned over opaque region 54.

Figure 10:
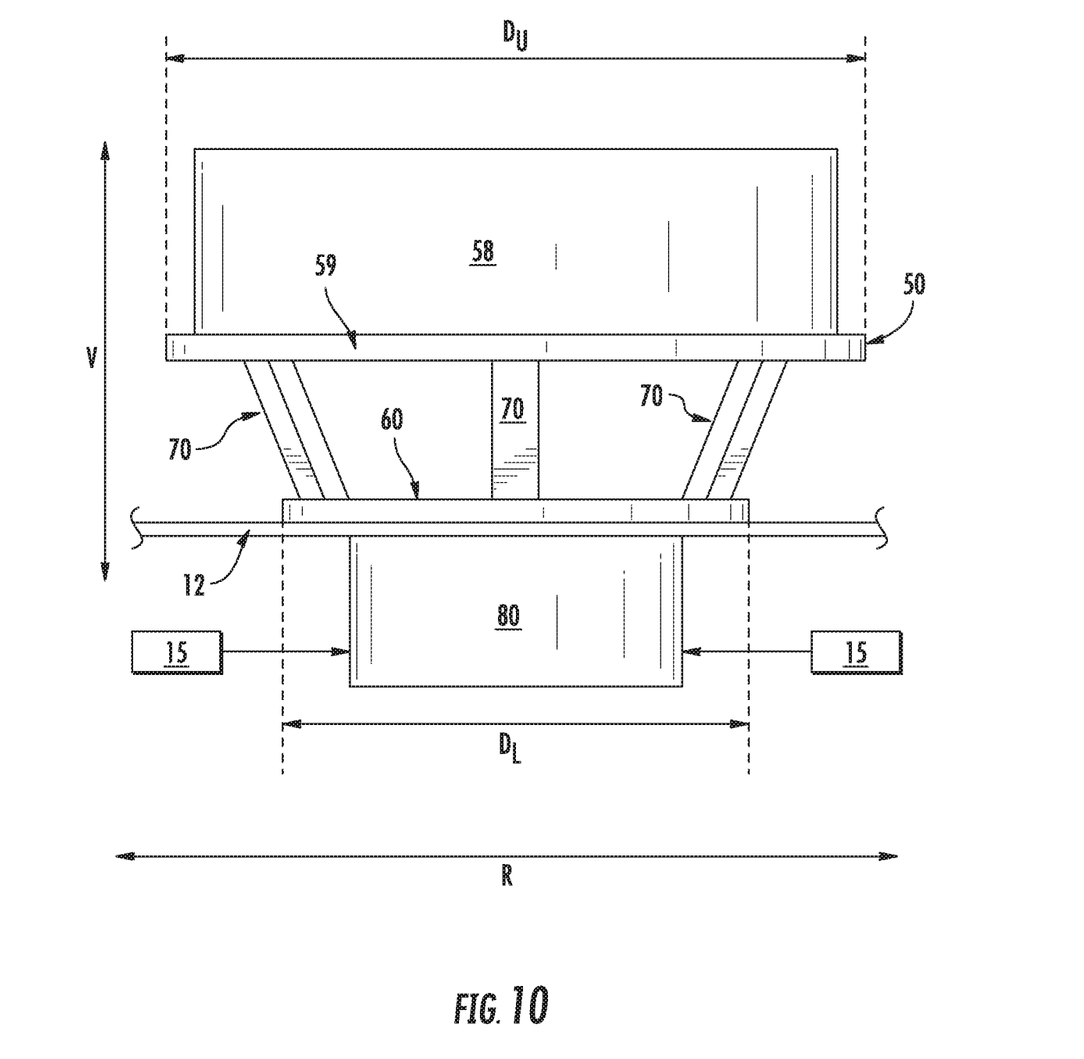
FIG. 10 provides a side view of another exemplary embodiment of a light guide for a knob assembly of the present disclosure.

Referring now to FIG. 10, another exemplary embodiment of light guide 40 is shown. In this embodiment, light guide 40 includes a shaft 80 that extends from lower portion 60 through aperture 13 along vertical direction V. Further, light source 15 is positioned orthogonal to vertical direction V such that light emitted by light source 15 is received by light guide 40 via an outer surface of shaft 80.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A knob assembly for a cooking appliance, the knob assembly comprising:
   a light guide positioned at an aperture defined by a cooktop surface of the cooking appliance, the light guide defining a guide opening, the light guide including a plurality of circumferentially spaced support members extending between an upper portion of the light guide and a lower portion of the light guide;
   a light source located below the cooktop surface along a vertical direction, the light source positioned such that light emitted by the light source is received by the light guide;

a stem extending through the guide opening; and a control knob rotatably coupled to the stem, the control knob independently rotatable relative to the light guide, the control knob defining a light opening, wherein the control knob is rotatable to a first position in which the light opening is positioned entirely over an opaque region of the light guide along the vertical direction, and wherein the control knob is rotatable to a second position in which the light opening is positioned entirely over a translucent region of the light guide along the vertical direction.

2. The knob assembly of claim 1, wherein the control knob is rotatable to an intermediate third position in which a first portion of the light opening is positioned over the translucent region of the light guide along the vertical direction, and a second portion of the light opening is positioned over the opaque region of the light guide along the vertical direction.

3. The knob assembly of claim 1, further comprising a bezel positioned between the surface and an upper portion of the light guide along the vertical direction.

4. The knob assembly of claim 1, further comprising a lens positioned between the light guide and the control knob along the vertical direction.

5. The knob assembly of claim 4, wherein the lens further includes a raised portion that extends into the light opening of the control knob.

6. The knob assembly of claim 1, wherein the light source is collinear with the aperture along the vertical direction.

7. The knob assembly of claim 1, wherein the upper portion defines a first maximum diameter and the lower portion defines a second maximum diameter, and wherein the first maximum diameter is greater than the second maximum diameter.

8. The knob assembly of claim 7, wherein each support member of the plurality of support members extends inward from the upper portion to the lower portion along a radial direction.

9. The knob assembly of claim 1, wherein the light guide includes a shaft that extends from the lower portion through the aperture along the vertical direction.

10. The knob assembly of claim 9, wherein the light source is positioned orthogonal to the vertical direction such that light emitted by the light source is received by the light guide via an outer surface of the shaft.

11. The knob assembly of claim 1, wherein the light guide includes a top surface and a side surface extending downwardly from the top surface along the vertical direction.

12. The knob assembly of claim 11, wherein the top surface includes both the opaque region and the translucent region of the light guide.

13. The knob assembly of claim 11, wherein the light guide includes a flange that extends outward from the side surface and surrounds a perimeter of the side surface.

14. The knob assembly of claim 13, wherein the flange is positioned between the control knob and the bezel along the vertical direction.

15. The knob assembly of claim 1, wherein each support member is comprised of translucent material.

16. A cooktop appliance, comprising:

a cooktop surface defining an aperture;

a burner disposed within the cooktop surface; and a knob assembly, comprising:

a light guide positioned at the aperture, the light guide defining a guide opening, the light guide including a plurality of circumferentially spaced support members extending between an upper portion of the light guide and a lower portion of the light guide;

a light source located below the cooktop surface along a vertical direction, the light source positioned such that light emitted by the light source is received by the light guide;

a stem extending through the guide opening; and a control knob rotatably coupled to the stem and independently rotatable relative to the light guide, the control knob defining a light opening, wherein the control knob is rotatable to a first position in which the light opening is positioned entirely over an opaque region of the light guide along the vertical direction, and wherein the control knob is rotatable to a second position in which the light opening is positioned entirely over a translucent region of the light guide along the vertical direction.

17. The cooktop appliance as in claim 16, wherein the control knob is rotatable to an intermediate third position in which a first portion of the light opening is positioned over the translucent region of the light guide along the vertical direction, and a second portion of the light opening is positioned over the opaque region of the light guide along the vertical direction.

18. The cooktop appliance as in claim 16, wherein the stem extends from a controller configured for controlling the amount of heat delivered by the burner.

19. The cooktop appliance as in claim 16, wherein the light source is a light emitting diode.

20. The cooktop appliance of claim 16, wherein the cooktop surface is positioned between the light source and the light guide along the vertical direction.

* * * * *